United States Patent [19]
Smith

[11] 3,877,828
[45] Apr. 15, 1975

[54] MACHINE KEY

[76] Inventor: Robert F. Smith, 3130 Traver, West Vancouver, British Columbia, Canada

[22] Filed: Aug. 6, 1973

[21] Appl. No.: 386,166

[52] U.S. Cl. .................. 403/358; 403/409; 403/318
[51] Int. Cl. ............................................. F16d 1/08
[58] Field of Search ........... 403/358, 356, 357, 409, 403/16, 375, 318; 52/753 G; 85/79; 254/104

[56] References Cited
UNITED STATES PATENTS

| | | | |
|---|---|---|---|
| 183,546 | 10/1876 | Dickenson | 403/358 |
| 861,992 | 7/1907 | Lauderbaugh | 403/358 |
| 1,435,811 | 11/1922 | Cuntala | 403/358 |
| 2,078,824 | 4/1937 | Wirth | 254/104 X |
| 3,175,852 | 3/1965 | Durand | 403/356 |
| 3,362,734 | 1/1968 | Downie | 403/356 |
| 3,494,481 | 2/1970 | Smith | 85/79 |

*Primary Examiner*—Andrew V. Kundrat
*Attorney, Agent, or Firm*—Fetherstonhaugh & Co.

[57] ABSTRACT

A machine key having lower and upper cooperating wedges which are insertable into a keyway to lock two machine parts against relative movement or accidental separation. The lower wedge has a small end and the upper wedge has a large end which project beyond an end face of a machine part when the key is jammed in the keyway. Near these projecting ends, there are transverse holes in each of the wedges. A stop pin is inserted into a transverse hole in the lower wedge to limit inward movement of the wedge as the upper wedge is tapped home. The stop pin is transferred to a hole in the upper wedge to limit inward movement of that wedge when the lower wedge is tapped inwardly to release the key from the keyway.

5 Claims, 6 Drawing Figures

PATENTED APR 15 1975 3,877,828
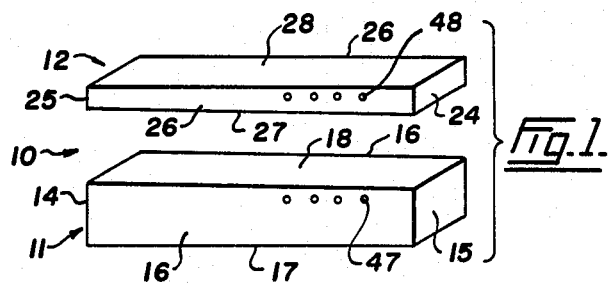
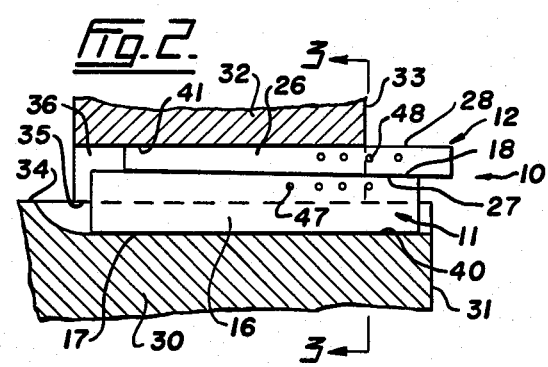
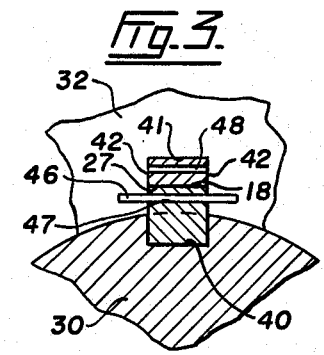
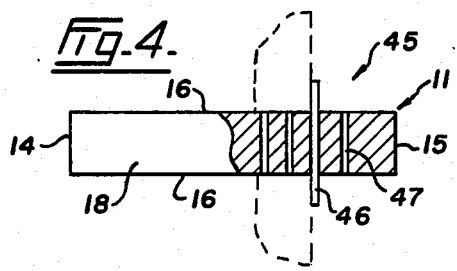
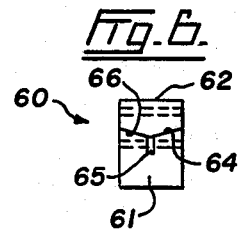
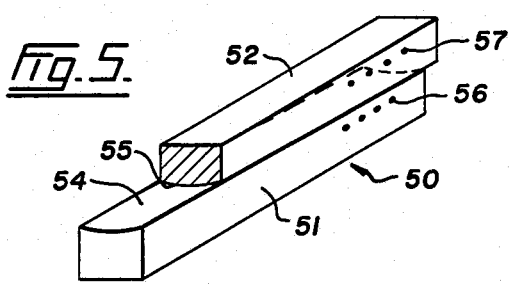

MACHINE KEY

This invention relates to an improved machine key.

It is customary to secure one machine part to another by means of a key and, where it is imperative that a flywheel or the like be attached to a shaft which rotates at high speed, a tapered key generally is used in an effort to achieve a wedging action which will take up any slack motion which may exist between the parts. Such a key is driven into the keyway by blows applied to one end of the key and very often the opposite end of the key is not accessible to permit the application of blows which will drive the key out of the keyway whenever the machine parts must be dismantled. This may make it necessary to resort to drilling and tapping the key which is a time consuming and otherwise unsatisfactory solution to the problem of separating keyed machine parts.

The present invention contemplates a two-part key formed of wedges which co-operate to provide a particularly effective wedging action in the keyway. The two machine parts which are secured together by such a key initially may not be a close fit but the wedging action of the key will compensate for any slack motion so that there is little likelihood of vibration developing which might damage the parts or result in accidental separation at high rotating speeds. The two-part key can be quickly and easily installed and can just as readily be removed from the keyway no matter how tightly it has been jammed therein.

In drawings which illustrate preferred embodiments of the invention,

FIG. 1 is a perspective view showing a machine key constructed in accordance with the present invention, FIG. 2 is a vertical section showing the present key in a typical position of use, FIG. 3 is a section taken on the line 3—3 of FIG. 2, FIG. 4 is a plan, part in section, of a lower wedge of the key showing stop means of the invention, FIG. 5 is a perspective view, part broken away and shown in section, of another embodiment of the invention, and FIG. 6 is an end elevation of still another embodiment of the invention.

Referring to the drawings, the numeral 10 indicates generally a machine key comprising a lower wedge 11 and a relatively small upper wedge 12 both preferably made of good quality steel.

Wedge 11 has a large end 14, a small end 15, parallel side faces 16, a bottom face 17, and a top face 18.

The wedge 12 has corresponding ends and surfaces numbered 24 to 28. It will be noted that the wedges 11 and 12 are of exactly the same width and may be the same length as well. However, the wedge 11 is much thicker than the wedge 12, i.e., the thickness of the large end 14 may be twice that of the large end 24.

The key 10, of course, is intended to secure one machine part against rotation relative to another machine part. For example, the numeral 30 in FIGS. 2 and 3 indicate a drive shaft which is fitted near end 31 thereof with a sprocket 32 having an outer face 33. The shaft and sprocket have abutting faces 34 and 35 respectively which are provided with complementary grooves forming a common keyway 36. Normally, such machine parts will allow a key to be entered into its keyway only from the outer end 31 of the shaft since the groove in the shaft is blind at the inner end thereof and the inner end of the corresponding groove in the sprocket very often is obstructed by other machine parts. Keyway 36 is rectangular in cross section and has plane bottom and top walls 40 and 41 as well as plane side walls 42.

In order to facilitate installation and removal of the key 10 from the keyway 36, the present invention includes stop means generally indicated at 45. As shown in FIGS. 1 to 4, the means 45 comprises a cylindrical pin 46 which has a length greater than the width of the key 10. This stop pin 46 is adapted to be inserted through a selected one of a number of holes 47 and 48 which are formed in the wedges 11 and 12. The holes 47 extend transversely through the wedge 11, between the side faces 16 and near the small end 15, and are equidistantly spaced apart and parallel to said small end. The holes 48 are similarly arranged in the upper wedge 12 except that they are located near the large end 24 of the wedge.

Key 10 is installed in the keyway 36 by first inserting the stop pin 46 in one of the holes 47 and then entering the wedge 11, large end 14 first, into the shaft groove from the outer end of the keyway. The hole 47 selected to receive the pin 46 is one which will allow the pin to contact the end face 33 when the wedge is properly positioned in the keyway as shown best in FIG. 2. The width of the wedge 11 is only slightly less than the width of the keyway so that a snug fit is achieved with little or no side play. Wedge 11 is thick enough to extend across the abutting faces 34 and 35 of the shaft and sprocket with the holes 47 being disposed above the periphery of the shaft end.

The wedge 12 is entered into the keyway 36, small end 25 first, and with the faces 18 and 27 of the two wedges in sliding contact with one another. Like the wedge 11, the wedge 12 is a snug fit in the keyway but the opposite taper on the two parts of the key allow this inward movement of the upper wedge to take place until the top face 28 engages the top wall 41 of the keyway whereupon resistance is offered to further inward movement. This resistance occurs when the large end 24 of the upper wedge is still projecting some distance from the outer face 33 of the sprocket. A hammer (not shown) is then used to tap the large end 24 whereby to drive the upper wedge firmly into the keyway. The lower wedge 11 cannot move inwardly as the upper wedge 12 is driven home by virtue of the fact that the stop pin 46 is bearing against the outer face 33 of the sprocket.

The wedges 11 and 12 are now jammed in the keyway 36 with their parallel bottom and top faces 17 and 27 clamped to the bottom and top walls 40 and 41 of the keyway. This wedging action takes up any slack motion which may have existed in the fitting of the sprocket to the shaft and the two machine parts are then firmly held against relative movement.

To remove the key 10, the stop pin 46 is withdrawn from the hole 47 using a pair of pliers or a small punch and the pin is then inserted in a hole 48 in the upper wedge. A punch or the like (not shown) is placed against the small end 15 of the lower wedge and is hammered to drive the wedge inwardly. This breaks the wedging action since the upper wedge 12 is held against inward movement by the stop pin 46. Both wedges of the key can then be pulled outwardly without the need for trying to drive the key from its inner end.

Referring now to FIG. 5 which shows another embodiment of the invention, the numeral 50 indicates generally a key made up of wedges 51 and 52. These wedges are constructed substantially in the same manner as before except that contacting faces 54 and 55 of the two wedges are transversely curved across the width of the wedges. In other words, the top face 54 of the lower wedge is concave while the bottom face 55 of the upper wedge is convex. The above mentioned stop pin 46 is inserted through holes 56 and 57 formed in the wedges 51 and 52 respectively and in the previously described manner to install the modified key 50 in a keyway and to remove it therefrom.

The concave and convex faces of the wedges 51 and 52 give a slightly better wedging action to the key 50 in the keyway 36. As the upper wedge 52 is tapped into place with a hammer, the transversely curved contacting faces 54 and 55 allow the upper wedge to roll slightly about its longitudinal axis assuming said wedge initially is not the usual snug fit in the keyway. This ensures that the top face of the wedge 52 is in full contact with the top wall 41 of the keyway whereby to add to the resistance offered against withdrawal of the upper wedge from the keyway and the resistance is further increased by the slightly larger area provided by the curved contacting faces 54 and 55 over the plane contacting faces 18 and 27 of the main embodiment of the invention.

FIG. 6 shows still another embodiment of the invention which is provided by a key 60 having wedges 61 and 62. Lower wedge 61 has a top face 64 which is substantially V-shaped across the width of the wedge. A longitudinally extending and centrally disposed groove 65 is formed in the face 64 to extend between the large and small ends of the wedge 61. The wedge 62 has a bottom face 66 which is correspondingly V-shaped across the width of the wedge. This modified key 60 also is installed and removed from a keyway using the stop means 45.

When the upper wedge 62 is tapped home as previously described, the side faces of the lower wedge 61 are spread apart very slightly above the groove 65 and so as to positively grip the side walls 42 of the keyway. The key 60 is wedged against the sides of the keyway as well as against the top and bottom walls thereof and therefore it is virtually impossible for the key to come adrift accidentally or to loosen to the extent that slack play will develop between the two machine parts.

From the foregoing, it will be apparent there is provided a simply constructed and relatively inexpensive key which will compensate for slack motion in the connected machine parts. The key is easy to install and remove from the unobstructed end of the keyway and this can be done without damage to the key so that it can be used over and over again.

What is claimed is:

1. A key for use in a keyway formed in the abutting faces of two machine parts one of which has an end face, said key comprising a lower wedge having a big end and a small end projecting beyond the end face, an upper wedge having a small end and a large end projecting beyond the end face, said wedges having contacting faces intially in sliding engagement with one another when the wedges are entered into the keyway from the end face, said lower and upper wedges each having a plurality of longitudinally spaced transverse holes near the small and large ends thereof respectively and which are spaced radially from said contacting faces, and a stop pin adapted to be projected through a selected one of the holes to bear against the end face, said stop pin being insertable through a selected one of the holes in the small end of the lower wedge to engage the end face and limit inward movement of said lower wedge when the upper wedge is forced into the keyway, and said stop pin being removable from the lower wedge hole and insertable through a selected one of the holes in the large end of the upper wedge to engage the end face and limit inward movement of said upper wedge when the lower wedge is driven inwardly initially to release the key from the keyway.

2. A key for use in a keyway formed in the abutting faces of two machine parts one of which has an end face, said key comprising a first and second wedges each having a big end and a small end, said wedges having contacting faces initially in sliding engagement with one another when the wedges are entered into the keyway from the end face, said contacting faces being transversely V-shaped across the widths of the first and second wedges, said small end of the first wedge and said large end of the second wedge projecting outwardly beyond the end face, and removable stop means securable to the small end of the first wedge or the large end of the second wedge adapted to engage the end face and limit movement of a selected wedge into the keyway.

3. A key as claimed in claim 2, in which one of said wedges has a longitudinal groove on the contacting face thereof.

4. A key for use in a keyway formed in the abutting faces of two machine parts one of which has an end face, said key comprising a lower wedge having a big end and a small end projecting beyond the end face, an upper wedge having a small end and a large end projecting beyond the end face, said wedges having contacting faces intially in sliding engagement with one another when the wedges are entered into the keyway from the end face, said contacting faces of the lower and upper wedges being concave and convex respectively across the widths of said wedges, said lower and upper wedges having transverse holes near the small and large ends thereof respectively, and a stop pin adapted to be projected through a selected one of the holes to bear against the end face.

5. A key as claimed in claim 4, in which the contacting face of the lower wedge is V-shaped across the width of said wedge with said face having a longitudinally extending and centrally disposed groove, said contacting face of the upper wedge being shaped to correspond to the contacting face of the lower wedge.

* * * * *